US008257772B2

(12) United States Patent
Eisner et al.

(10) Patent No.: US 8,257,772 B2
(45) Date of Patent: Sep. 4, 2012

(54) METHOD FOR OBTAINING A VEGETABLE PLANT PROTEIN FRACTION, IN PARTICULAR FOR PRODUCING VEGETABLE ICE CREAM

(75) Inventors: Peter Eisner, Freising (DE); Klaus Müller, Freising (DE); Claudia Pickardt, Freising (DE); Andreas Malberg, München (DE)

(73) Assignee: Fraunhofer-Gesellschaft zur Föderung der Angewandten Forschung E.V., München (DE)

( * ) Notice: Subject to any disclaimer, the term of this patent is extended or adjusted under 35 U.S.C. 154(b) by 951 days.

(21) Appl. No.: 12/087,794

(22) PCT Filed: Jan. 17, 2007

(86) PCT No.: PCT/DE2007/000064
§ 371 (c)(1),
(2), (4) Date: Jul. 15, 2008

(87) PCT Pub. No.: WO2007/082507
PCT Pub. Date: Jul. 26, 2007

(65) Prior Publication Data
US 2009/0011107 A1   Jan. 8, 2009

(30) Foreign Application Priority Data
Jan. 17, 2006 (DE) .......................... 10 2006 002 249

(51) Int. Cl.
*A23G 9/00* (2006.01)
(52) U.S. Cl. ......... 426/565; 426/634; 426/656; 530/377
(58) Field of Classification Search .................. 426/565
See application file for complete search history.

(56) References Cited

U.S. PATENT DOCUMENTS
2007/0154611 A1   7/2007   Snowden et al.

FOREIGN PATENT DOCUMENTS
| EP | 1 405 572 A1 | 4/2004 |
|---|---|---|
| WO | WO 92/21247 A1 | 12/1992 |
| WO | WO 99/51106 A1 | 10/1999 |
| WO | WO 2004/082397 A1 | 9/2004 |
| WO | WO 2006/076889 A2 | 7/2006 |

OTHER PUBLICATIONS

Massoura et al. "Isolation and Funcitonal Properties of Proteins from Crambe abyssinica Oil Seeds" in Progress in new crops, J. Janic (ed), 1996, p. 322-327.*
Clark et al. "Protein Fractionation by Precipitation with Carboxymethyl Cellulose" in Downstream Processing and Bioseparation, Hamel J. et al (ed), 1990, p. 170-187.*
A. Raymundo et al: "Optimization of the Composition of Low-Fat-Oil-In-Water Emulsions Stabilized in White Lupin Protein"; Journal of the American Oil Chemists' Society, AOCS Press, Champaign, IL, US, vol. 79, No. 8, Aug. 2002, pp. 783-790; XP001124618.
Shuryo Nakai: "Structure-Function Relationships of Food Proteins With an Emphasis on the Importance of Protein Hydrophobicity"; American Chemical Society, J. Agric. Food Chem., 1983, vol. 31, pp. 676-683.

* cited by examiner

*Primary Examiner* — Elizabeth Gwartney
(74) *Attorney, Agent, or Firm* — Breiner & Breiner, L.L.C.

(57) ABSTRACT

A method for obtaining a vegetable protein fraction, in particular for producing vegetable ice cream, is described wherein vegetable parts are added to water or to an aqueous solvent in order to dissolve and/or disperse vegetable proteins from the vegetable parts, and wherein one or more vegetable protein fractions are separated from the aqueous mixture thus obtained by the separation. According to the method, one or more substances having lipophilic or amphiphilic boundary surfaces are added to the aqueous mixture in order to separate one or more vegetable protein fractions, to which dissolved and/or dispersed proteins having lipophilic or amphiphilic groups in the mixture attach. The substances including the attached proteins are separated from the mixture. A vegetable protein fraction having particularly good emulsifying characteristics is obtained by the method, the protein fraction being advantageous as an emulsifier in the production of vegetable ice cream.

16 Claims, No Drawings

METHOD FOR OBTAINING A VEGETABLE PLANT PROTEIN FRACTION, IN PARTICULAR FOR PRODUCING VEGETABLE ICE CREAM

TECHNICAL AREA OF APPLICATION

The present invention relates to a method for obtaining a vegetable protein fraction, in particular for producing vegetable ice cream, wherein vegetable parts are added to water or to an aqueous solvent in order to dissolve and/or disperse vegetable proteins from the vegetable parts, and wherein one or several vegetable protein fractions are separated from the aqueous mixture thus obtained by means of a separation method.

PRIOR ART

Ice cream and other creamy types of ice cream contain animal or vegetable fats and lactoprotein and/or lactose as well as egg protein in some cases. Lacto- and egg proteins in ice cream in particular fulfil texturing functions in addition to giving a possibly desired taste.

Ice cream is substantially produced by weighing the ingredients, pre-mixing, homogenising, pasteurising, chilling (+4° C.), allowing to mature, leaving to freeze in the ice-making machine (freezing), packing and storing.

Known among others are ice cream such as, for example, soft ice (at least 50% milk fraction and at least 270 g of whole egg or 90 g of egg yolk per litre of milk), cream ice (at least 18% milk fat from whipped cream), ice cream (at least 10% milk fat), single ice cream (at least 3% milk fat), milk ice (milk fraction at least 70%) and ice with vegetable fat (at least 3% vegetable fat). All said types of ice have in common that in addition to animal or vegetable fats, they also contain lactoprotein and lactose.

Many people have an intolerance to milk products or other animal ingredients so that they should avoid consuming milk or cream ice. For this group of consumers, there is so far no alternative to milk-containing ice cream having a comparable enjoyment value.

For the enjoyment value during the consumption of ice cream, the creaminess is particularly important. The creaminess is determined by the fat fraction and its binding into the overall matrix. In addition, the viscosity of the melt determines the creaminess of the ice. A higher-viscosity melt is perceived as creamier in the mouth than a melt having a low viscosity. In addition, the melting behaviour determines the organoleptic sensation during the enjoyment of the ice. An ice cream having a slow uniform melting behaviour is perceived as more pleasant that an ice cream having a heterogeneous and partly very rapid melting behaviour. The melting behaviour is determined inter alia by the whipping, i.e. the volume-related gas fraction (air or nitrogen) in the ice. Most creamy types of ice cream have a gas fraction of over 40, up to 50 vol. %. Such whipping is hitherto only attainable with conventional ingredients.

Other important quality parameters are the sensation in the mouth and the sensation of cold during consumption. If the emulsion effect and water binding of the matrix is insufficient, larger ice crystals form which can give a rough sensation in the mouth and a watery impression. The sensation of cold is also determined by the availability of the fat.

According to the prior art, creamy types of ice cream can only be achieved by larger quantities of fat, wherein the fat content should be higher than 15 wt. %, preferably higher than 20 wt. % to achieve the sensation of creaminess.

In hitherto known ice cream preparations having vegetable protection fractions, primarily based on soya, attempts have been made to replace animal emulsifiers by vegetable proteins. Dried vegetable proteins which had been obtained in conventional aqueous or aqueous-alcohol extraction processes and after drying as powder were used here.

Plants used for obtaining proteins for applications in ice cream contain between 10 wt. % and 50 wt. % of protein in the dry mass depending on the raw material. At the same time, the protein mass in plants does not consist of a defined substance. Rather the total protein includes a plurality of very different protein fractions. At the same time, each protein fraction is constructed of several 100 to more than 1000 amino acids having different amino acid sequences. The secondary, tertiary and quaternary structure of the proteins gives each molecule specific properties.

Thus, individual protein fractions possess particularly good properties as emulsifiers or gel forming agents, as water binding agents, foam forming agents or texture improvers. Depending on the production process, all these different protein fractions occur as a mixed protein product which is obtained, for example, by drying a protein solution.

So far, vegetable protein products have been obtained almost exclusively from soya beans. In this case, the beans are shelled, further comminuted by flocking or grinding and the protein is extracted from the soya flakes or the flour by adding water. The aqueous extract can be separated from the undissolved solids such as fibres, for example, by mechanical separating methods and discharged from the extraction process. The soya protein product can then be precipitated from the extract, enriched by membrane processes and/or dried.

With the aid of the technology described, the proteins are obtained as a protein product, although they consist of various protein fractions having different properties. The protein fractions have so far not been separated according to emulsifier-specific functional properties according to the prior art. Rather, fractionation has been carried out according to overall material parameters such as precipitability, solubility or molecular size.

It is thus possible to fold over protein molecules from extracts by lowering the pH, by adding specific salts or by heating, and to transfer them to a water-insoluble state. In this case, the protein molecules are juxtaposed to one another in the form of flakes. These can be separated mechanically from the proteins located in solution.

Another method for separating protein-containing suspensions and solutions comprises filtration or membrane processes. Suspended proteins can be separated from dissolved proteins by means of a simple filtration. It is also possible to separate different-sized molecules, for example, by ultra-filtration into a fraction comprising larger molecules and a fraction comprising smaller molecules. In this case, the specific properties of the fractions obtained can only be adapted to the requirements of the food industry to a small extent. In many cases, the larger and the precipitable molecular fractions have better properties as emulsifiers whilst the smaller or non-precipitable fraction has better properties as foam-forming agents.

WO 2006/076889 A2 describes a method for producing a vegetable protein ingredient for an ice cream. In this case, lupin seeds are prepared and initially crushed. Then, in one or several protein extraction steps, part of the lupin protein contained in the crushed lupin seeds is dissolved in an aqueous phase or at least dispersed. In order to obtain the protein ingredient, the lupin protein is separated by precipitation from the aqueous phase.

The object of the present invention is to provide a method for obtaining a vegetable protein fraction having particularly good emulsifying characteristics which can be used particularly advantageously as an emulsifier in the production of vegetable ice cream.

DESCRIPTION OF THE INVENTION

The object is achieved by the method according to claim 1. Advantageous embodiments of the method can be deduced from the dependent claims and the following description.

In the proposed method, vegetable parts, in particular shelled or unshelled vegetable seeds, are added to water or an aqueous solvent in order to dissolve and/or disperse vegetable proteins from the vegetable parts. Then, one or several substances having lipophilic or amphiphilic boundary surfaces are added to the mixture thus obtained or brought in contact with the mixture, to which dissolved and/or dispersed proteins having lipophilic or amphiphilic groups in the mixture, hereinafter also called target proteins, attach. The one or more substances comprising the attached proteins are separated from the mixture by a separating method in order to obtain the desired vegetable protein fraction(s).

In the method according to the invention, the mixture of different dissolved and/or dispersed protein fractions present in water or a water-containing solution is therefore fractionated by adding a lipophilic or amphiphilic phase boundary into the water or into the mixture. In this case, proteins having a high affinity to lipophilic substances attach to the lipophilic boundary surfaces and can thus be separated from other dissolved or dispersed substances.

The method therefore makes it possible to selectively obtain surface-active emulsifier protein which attaches to the lipophilic or amphiphilic boundary surfaces as result of its lipophilic or amphiphilic characteristics. This protein fraction obtained by the method in enriched form is particularly advantageous for the production of vegetable ice cream to which it is preferably added with a fraction between 0.5 and 6 wt. %. The selective fractionation of the proteins into a particularly efficient emulsifier protein fraction rendered possible by the present method makes it possible to produce ice cream having particularly positive properties and attractive organoleptic properties.

The method uses a substance which can advantageously attach lipophilic groups of proteins as a result of the lipophilic structures of the boundary surface. For example, lipophilic surfaces of polymers or other adsorber materials can be used, which are brought into contact with the protein mixture as a solid bed or as dispersed particles.

Protein fractions can surprisingly be obtained by this fractionation whose emulsifying capacity (binding capacity to oil in water) per gram of protein is increased by a factor of 5 compared to the originally present protein mixture. The amount of additional emulsifier required for different applications can be thus be reduced to a minimum.

In a particularly advantageous embodiment of the method, oil droplets or fat particles are used as the substance having a lipophilic boundary surface or surface. The proteins having defined lipophilic properties attach to this surface whereas proteins having less defined lipophilic properties do not attach or only attach to a small degree to the phase interface. Other substances having barely defined lipophilic properties such as, for example, saccharides, salts or fibres do not attach or only attached to a small extent to the lipophilic surfaces.

Proteins having a defined ratio of lipophilic and hydrophilic characteristics can be separated very efficiently from other dissolved or dispersed proteins by means of the proposed method. The proteins can be selected by adapting the surface properties, e.g. by selecting different polymers having different polar and non-polar groups at the surface. Since proteins always have hydrophilic regions in addition to the lipophilic group, depending on the lipophilic expression of the boundary surface, proteins can be fractionated according to their ratio of lipophilic groups to hydrophilic groups by the method according to the invention. The properties of the protein obtained in each case can thus be specifically optimised for use in different applications, for example, for producing vegetable ice cream.

When the target proteins from the mixture have attached to the surface, the remaining aqueous mixture will be separated from the lipophilic substances comprising the attached proteins. In the case of dispersed lipophilic particles or droplets, the aqueous phase can be separated mechanically. In addition to filtration, centrifugal methods can be used to this purpose. A prerequisite for good separation is that the lipophilic particles or droplets have a different density from the surrounding aqueous mixture.

Since in many cases, lipophilic substances have a comparable or somewhat lower density than water, floating of the lipophilic substances together with the attached proteins can be achieved. In order to increase the density difference, the aqueous phase can be enriched with soluble salts or with sugars for this purpose, which results in an increase in the specific density of the liquid. In a centrifugal field, the lighter lipophilic substances together with the attached proteins can then be separated from the liquid as a floating fraction and removed, for example, by means of decanting.

In a particularly advantageous embodiment of the method according to the invention, a vegetable oil or fat is added to the aqueous protein mixture as a lipophilic substance or phase. Depending on the particle size of the oil/fat phase, which can be definedly adjusted by technical means, a more or less large phase boundary is available. The lipophilic target proteins attach to this phase boundary and can be separated from the aqueous phase by centrifugation. It is thus possible to selectively separate particularly good emulsifier proteins from an aqueous protein mixture. In this case, the location in the plant at which the proteins were originally found is unimportant. Proteins having a defined ratio of lipophilic and hydrophilic groups attach to the oil phase boundary.

The oil which is to be used as the oil phase in the emulsion in the subsequent application in food is preferably used as said vegetable oil. For example, if it is desired to produce an ice cream with rapeseed oil as an ingredient, rapeseed oil droplets, optionally also together with other components of the rapeseed, can particularly advantageously be used as the lipophilic phase boundary in the aqueous protein mixture. The rapeseed oil mixture obtained by the fractionation can then be used directly as an ingredient for the vegetable ice cream.

The same applies to ice cream in which other vegetable oils are used. Optionally, certain substances which are desired in the subsequent preparation can be added to the oil before use as a lipophilic substance. Thus, flavourings, colourings, vitamins, secondary vegetable substances or other bioactive substances can be added. These substances are then present in the ice cream in a defined concentration.

In a further advantageous embodiment of the method according to the invention, the phase boundary is produced directly with the oil from the protein-containing plant. For example, the soya oil from the soya bean can be used for fractionating soya proteins. For this it is necessary to produce oil droplets by means of agitators, fast-running mixing units such as, for example, Turrax® or by means of ultrasound, at the surface whereof the proteins can attach. In the case of smaller droplet size, more surface area is available for attachment of the proteins. In this case, oil droplets having a droplet size of <100 µm, preferably <10 µm, are produced by means of the mixing or comminuting device.

However, as a result of the larger quantity of wedge fluid between the smaller oil droplets, more dissolved proteins not having the specific properties of the proteins attached to the boundary surface can be removed. In this case, it is helpful to separate the wedge fluid from the emulsifier proteins adhering to the oil droplets in one or several washing stages. A person skilled in the art is able to adjust the necessary droplet size according to the desired protein purity by selecting the agitation or ultrasound conditions and use the required number of washing steps which deliver the best results for the desired protein purity.

Particularly good emulsifier proteins are obtained by using oil-containing plants such as rapeseed, palm kernels, flax or sunflower. However, it is also possible to use oil-containing plants such as, for example, soya or lupin, for the said application. The selection is principally made on the basis of the desired organoleptic properties of the ice cream.

In an advantageous embodiment of the method according to the invention, the oil serves as an absorber surface and is not separated from the protein after a protein fractionation. The moist oil-protein mixture is then incorporated particularly advantageously directly into the ice cream. Thus, the ice is enriched with vegetable oil and a particularly stable ice emulsion is formed in which no organoleptically perceivable oxidative changes occur even after fairly long storage in the frozen state. In addition, the proteins are retained in their dissolved native structure. Complete separation of the water, for example, by means of drying would change the proteins and therefore cause a deterioration in the quality of the ice.

If the phase boundary is not produced with vegetable oil but with other adsorbers such as, for example, with polymers, the proteins must be subsequently separated from the adsorbers. Water, emulsions or lipophilic liquids such as hexane, acetone, alcohols or other solvents can be used for this purpose. The protein can optionally be obtained in pure form from these liquids by again separating the liquid from the protein. In the case of solvents, evaporation can take place.

A pure protein can also be obtained by separating the protein together with oil droplets from the aqueous mixture. After drying the water, the oil-protein mixture thereby obtained can be treated with a lipophilic solvent such as, for example, hexane or acetone or others, whereby the oil phase is removed and the protein is obtained in pure form. This pure emulsifier protein can also be used in other foods apart from being used in ice cream.

This also applies to the mixture of protein and vegetable oil obtained by fractionation which, in addition to the planned use in ice cream, can also be used for other applications as emulsifier protein. Possible applications for such proteins or protein-oil mixtures are, for examples, creams, mayonnaises, soups, sauces, drinks, bread, baked products, delicacies, salads and spreads.

After separating the lipophilic protein fraction from the aqueous mixture, hydrophilic protein fractions remain in solution. These can be concentrated by isoelectric precipitation or filtration methods and obtained as a protein isolate which is in particular characterised by high water solubility, foam-forming properties, gel formation and viscosity-forming properties. This hydrophilic protein product can advantageously be used in the production of drinks, frothed food products such as, for example, chocolate marshmallows, water- and milk-based desserts or baked products.

Depending on the requirements for the hydrophilic protein fraction, various pre-treatment steps with more or less lipophilic adsorbers in the aqueous protein mixture can be carried out. In this case, further fractions can be separated and the properties of the proteins removed with the adsorbers and the proteins remaining in the mixture can be further specialised. By combining various adsorbers, definedly hydrophilic proteins in highly pure form can ultimately be obtained as the end product.

EXEMPLARY EMBODIMENT

Example 1

Creamy Vegetable Ice with Reduced Fat Content 100 g of ground shelled sunflower seeds are mixed with 400 g of a sugar solution and the pH of the solution is adjusted to 7.5 with sodium hydroxide solution. The mixture is agitated for 4 minutes by means of a dispersing tool. The proteins contained in the sunflower seeds are thereby dissolved in the water. During this process, the oil contained in the seeds is released as a lipophilic further phase in addition to the aqueous phase and is therefore available as an adsorber surface. The proteins with particularly good emulsifier properties primarily attach to the oil droplets.

The insoluble components, predominantly fibres and shell residues, are then separated from the protein-oil-water dispersion by a sieve having a mesh size of 63 µm. The emulsion phase is obtained after centrifuging the filtrate by removing the upper layer. After the centrifuging, in contrast to the emulsion phase, the heavier liquid phase contains the proteins which emulsify less efficiently but are particularly highly soluble in water and can be further prepared for recovering said proteins. These proteins can be obtained, for example, by ultrafiltration.

The solid filtration residue is washed again with 200 g of sugar solution and another fraction of emulsifier proteins together with the residual oil and other soluble components is thus obtained.

The combined emulsion phase (82 g) containing the emulsifier proteins together with the sunflower oil is mixed with 400 g of water to separate impurities such as soluble non-emulsifier proteins. The mixture is then centrifuged. The emulsifier proteins then remain bound to the oil and can thus be separated as a floating phase. This emulsion phase is then washed with water in the same way in order to separate undesirable soluble components. 82 g of an emulsion containing about 1.5% emulsifier proteins and 33% fat are obtained. Finally, the desired water or oil content of the emulsion is adjusted by adding water.

The emulsion produced is used to produce ice cream according to the recipe given in Table 1. In addition to the stabiliser protein, the emulsion already has a fat fraction so that an additional addition of vegetable fat is omitted. In this case, a particularly creamy, purely vegetable ice cream having a very low fat content of only 8% is achieved. In this case, the fat is so well emulsified that no large ice crystals form in the ice even after fairly long storage for 6 months. The ice is therefore very stable under storage and remains creamy over a long time.

TABLE 1

Recipe for producing vegetable ice cream

| | Ingredients in g |
|---|---|
| Emulsion having 71% water content | 279 |
| Protein in the emulsion | 3 |
| Water in the emulsion | 198 |
| Oil in the emulsion | 78 |
| Water additionally | 432 |
| Sugar | 145 |
| Glucose syrup, dry | 25 |
| Maltodextrin | 80 |
| Lupin protein | 39 |
| Total | 1000 |

Example 2

Vegetable Ice Having a Creamy Ice Character

The emulsion from Example 1 is incorporated into a creamy ice recipe in place of cream. As a result of the good emulsifier effect of the protein, the addition of artificial emulsifiers can be dispensed with. The stability of the emulsion in this "cream ice" is also very good and good storage stability is obtained.

The invention claimed is:

1. A method for obtaining a vegetable protein fraction comprising adding shelled or unshelled vegetable seeds to water or to an aqueous solvent in order to dissolve and/or disperse vegetable proteins from the shelled or unshelled vegetable seeds and provide an aqueous mixture thereof, and separating one or more vegetable protein fractions from the aqueous mixture by a separation method, wherein one or more substances having lipophilic boundary surfaces are added to the aqueous mixture in order to separate the one or more vegetable protein fractions, to which attach dissolved and/or dispersed proteins having lipophilic or amphiphilic groups in the aqueous mixture to provide attached proteins, wherein said one or more substances are vegetable oil and/or vegetable fat, and wherein the one or more substances comprising the attached proteins are separated from the aqueous mixture.

2. The method according to claim 1, wherein the one or more substances are dispersed in the aqueous mixture.

3. The method according to claim 1, wherein the vegetable oil together with the vegetable proteins are extract from the shelled or unshelled vegetable seeds and are distributed as oil droplets in the aqueous mixture by a mixing or comminuting device.

4. The method according to claim 3, wherein the oil droplets have a droplet size <100 μm and are produced by the mixing or comminuting device.

5. The method according to claim 3, wherein the oil droplets have a droplet size <10 μm and are produced by the mixing or comminuting device.

6. The method according to claim 3, further comprising, after separation from the aqueous mixture, subjecting the oil droplets with the attached proteins to one or more washing steps to wash away liquid from the proteins adhering to the oil droplets.

7. The method according to claim 3, further comprising, after separation from the aqueous mixture, subjecting the oil droplets with the attached proteins to one or more washing steps to wash away liquid from the proteins adhering to the oil droplets.

8. The method according to claim 1, wherein before adding the water or the aqueous solvent, the shelled or unshelled vegetable seeds are subjected to flocking.

9. The method according to claim 1, wherein the shelled or unshelled vegetable seeds are from a full-fat seed.

10. The method according to claim 1, further comprising separating the one or more substances with the attached proteins from the aqueous mixture by a mechanical separating method.

11. The method according to claim 10, wherein the one or more substances with the attached proteins are separated as a floating fraction.

12. The method according to claim 10 or 11, further comprising adding a substance which increases specific density of the aqueous mixture to the aqueous mixture to increase a density difference between the aqueous mixture and the one or more substances with the attached proteins.

13. The method according to claim 10, wherein the mechanical separating method is centrifugation.

14. The method according to claim 1, wherein the one or more substances with the attached proteins are separated from the proteins by one or more further separating steps.

15. The method according to claim 1, wherein, after separating the one or more substances with the attached proteins from the aqueous mixture, proteins remaining in the aqueous mixture are concentrated by isoelectric precipitation or filtration and obtained as protein isolate.

16. The method according to claim 1, wherein protein fractions having different protein characteristics and/or hydrophilic proteins in substantially pure form as protein isolate are obtained by a plurality of separating steps, each step being carried out with substances having different lipophilic boundary surfaces added to the remaining aqueous mixture.

* * * * *